3,278,578
CERTAIN POLYNITRATO COMPOUNDS AND
THEIR PREPARATION
Milton B. Frankel, Menlo Park, Calif., assignor to Aerojet-General Corporation, Azusa, Calif., a corporation of Ohio
No Drawing. Original application June 8, 1964, Ser. No. 374,234, now Patent No. 3,228,929, dated Jan. 11, 1966. Divided and this application Sept. 8, 1965, Ser. No. 529,623
4 Claims. (Cl. 260—467)

This is a division of application Serial No. 374,234, filed June 8, 1964, now U.S. Patent No. 3,228,929.

This invention pertains to several classes of novel compounds containing a plurality of nitro or nitrato groups, and to their various methods for preparation.

It is an object of this invention to provide several groups of novel polynitro compounds. A further object of this invention is to prepare a new class of polynitrato compounds. Another object of this invention is to prepare new classes of compounds which are especially useful in explosives. Still another object of this invention is to create new synthesis techniques in the preparation of polynitro and polynitrato compounds. These and other objects of my invention will be apparent from the detailed description which follows.

One of the novel classes of compounds of this invention are the heterocyclic polynitro compounds having the general formula:

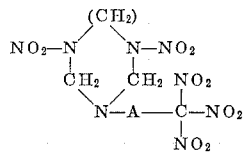

wherein in the above formula, A is lower alkylene, preferably having from 1 to about 6 carbon atoms; and $n$ is an integer of from 1 to 2. Preferably, in the above formula, A is methylene or ethylene, and $n$ is 1.

Typical compounds within the scope of the above formula include:

1-(3',3',3'-trinitropropyl)-3,5-dinitro-1,3,5-triazacyclohexane,
1-(4',4',4'-trinitrobutyl)-3,5-dinitro-1,3,5-triazacyclohexane,
1-(3',3',3'-trinitropropyl)-3,6-dinitro-1,3,6-triazacycloheptane,
1-(4',4',4'-trinitrobutyl)-3,6-dinitro-1,3,6-triazacycloheptane.

The novel compounds of Formula I are prepared by reacting a dinitraza alkanediol with an N-(polynitro-alkyl) amine in accordance with the following general reaction scheme:

(II)
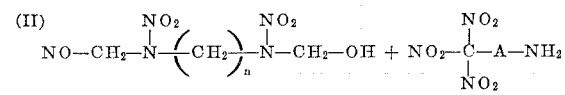
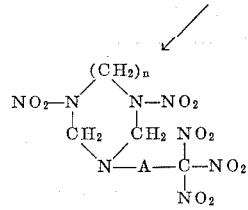

wherein A and $n$ are as defined above. In the above reaction the N-(polynitro-alkyl) amine may be either in the form of the free amine or in the form of the amine hydrohalide salt, the latter form being preferred, especially the amine hydrochloride salt, since it is normally more stable.

The dinitraza alkanediols employed in the above reaction are preferably, although not necessarily, prepared at 0° C. to about 50° C. in situ from stoichiometrically equivalent amounts of the corresponding dinitramine and formaldehyde prior to the addition of the amine or amine hydrochloride. This preparation involves the following reaction:

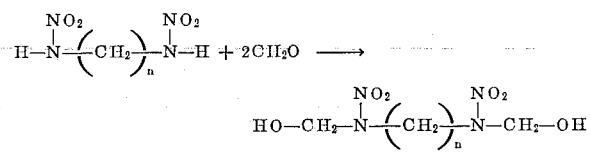

wherein $n$ is equal to 1 or 2. This procedure is most desirable since it has been found that if the primary amine and formaldehyde are contacted, there readily occurs a reaction which results in the production of triazines and other undesirable by-products.

The Reaction II is conveniently carried out in any polar solvent in which the reactants are soluble, i.e., water, methanol, ethanol, etc. It is to be understood that when the N-(polynitro-alkyl) amine reactant is in a form of the hydrohalide salt, the solvent is preferably made alkaline by the addition of a base which is more strongly basic that the N-(polynitro-alkyl) amine and which is capable of converting the amine hydrochloride to the free amine. Typical bases which will liberate the free amine are sodium hydroxide, potassium hydroxide, lithium hydroxide and salts of a strong base and a weak acid, such as sodium acetate.

The proportions of the reactants employed are not critical. Normally, stoichiometrically equivalent amounts are used since this results in the most complete utilization of reactants. The reaction temperature should normally be sufficiently high so that the reactants will dissolve to a substantial degree in the reaction medium, but below the decomposition temperature of the dinitraza alkanediol reactant. Normally, the reaction is conducted at a temperature of between about 0° C. and about 100° C. The preferred reaction temperature is from about 15° C. to about 50° C.

Pressure is not critical in this reaction; therefore, while any pressure can be used, the reaction is normally conducted at atmospheric pressure. Agitation of the reactants, such as by mechanical stirrer, while desirable in that it increases the reaction rate, is not a necessity. The products of Reaction II are normally solids, and may be isolated in conventional manner by filtration, evaporation, and/or crystallization.

To more clearly illustrate this aspect of my invention, the following examples are presented. It is to be understood that the examples are intended as illustrative embodiments of the invention and should not be construed as limitative of the scope of the invention in any way. In the examples, the percentages and parts are by weight unless otherwise indicated.

EXAMPLE I

Preparation of 1-(3',3',3'-trinitropropyl)-3,5-dinitro-1,3,5-triazacyclohexane

In a 100-ml. 3-necked flask, fitted with a stirrer, and dropping funnel, was placed 2.9 grams (0.02 mole) of methylene dinitramine, 3.2 grams (0.04 mole) of 37 percent formalin, and 15 ml. of water. The yellow solution was stirred for 10 minutes and 4.6 grams (0.02 mole) of 3,3,3-trinitropropylamine hydrochloride was added. A solution of 1.84 grams (0.02 mole) of sodium acetate in 25 ml. of water was added dropwise. The white solid was collected and dried, 5.0 grams (71.4 percent), M.P. 120 to 128° d. Two recrystallizations from chloroform gave white needles, M.P. 144 to 146° d.

*Analysis.*—Calc'd for $C_6H_{10}N_8O_{10}$: C, 20.34; H, 2.85; N, 31.64. Found: C, 20.32; H, 2.93; N, 32.36.

EXAMPLE II

*Preparation of 1-(4',4',4'-trinitrobutyl)-3,6-dinitro-1,3,6-triazacycloheptane*

In a 100-ml. 3-necked flask, fitted with a stirrer, and dropped funnel, is placed 0.02 mole of ethylene dinitramine, 0.04 mole of 37 percent formalin, and 15 ml. of water. The yellow solution is stirred for 10 minutes and 0.02 mole of 4,4,4-trinitrobutylamine hydrochloride is added. A solution of 0.02 mole of sodium acetate in about 25 ml. of water is added dropwise. The solid is collected and dried. Several recrystallizations from chloroform gives a needle-like product which is 1-(4',4',4'-trinitrobutyl)-3,6-dinitro-1,3,6-triazacycloheptane.

Another class of novel polynitro compounds forming a part of my invention are those containing the trifluoromethyl group and having the general formula:

(III) 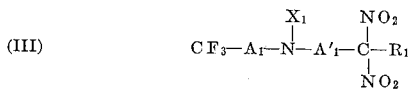

wherein $X_1$ is selected from the group consisting of hydrogen and nitro, $A_1$ and $A'_1$ are lower alkylene, and $R_1$ is selected from the group consisting of nitro and lower alkyl. In the above formula when $R_1$ is lower alkyl, the group normally contains from 1 to about 6 carbon atoms such as methyl, ethyl, isopropyl and hexyl. The lower alkylene groups, $A_1$ and $A'_1$ normally contain up to about 6 carbons. Typical of these alkylene groups are methylene, ethylene and hexamethylene.

The compounds of the above formula wherein $X_1$ is hydrogen are prepared in accordance with the following general reaction equation:

(IV) 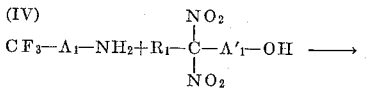

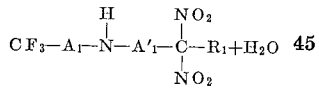

wherein $R_1$, $A_1$ and $A'_1$ are as defined above in Formula III.

The compounds of Formula III wherein $X_1$ is nitro, are prepared by reacting the product of Reaction IV with a strong nitrating agent, as shown in the following reaction equation where nitric acid is the nitrating agent:

(V) 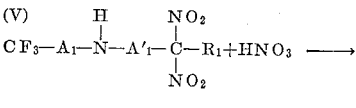

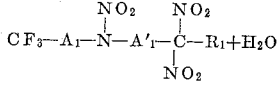

wherein $R_1$, $A_1$ and $A'_1$ are as previously defined.

In Reaction IV above, the free amine may be used or, alternatively, the amine hydrohalide, with the amine hydrochloride being preferred. Reaction IV is ordinarily carried out in the presence of an inert polar solvent such as water or methanol at a temperature from about 20° C. to about 100° C. For best results, both in terms of yield and reaction rate, this reaction is conducted in the presence of a basic material such as sodium hydroxide, potassium hydroxide, calcium hydroxide or sodium acetate. While not critical, the amine and the alcohol reactants are usually employed in about stoichiometric amounts.

The nitration Reaction V is commonly carried out employing concentrated nitric acid at a temperature of from about −20° C. to about +20° C., preferably in the presence of acetic anhydride. Other strong nitrating agents such as nitrogen tetroxide may be used.

The products of Reactions IV and V may be isolated in conventional manner such as by extraction, crystallization and/or evaporation.

The following examples illustrate preparation of the compounds of Formula III:

EXAMPLE III

*Preparation of 1,1,1-trifluoro-5,5,5-trinitro-3-azapentane*

To a solution of 1.36 grams (0.01 mole) of 2,2,2-trifluoroethyl amine hydrochloride, 1.81 grams (0.01 mole) of trinitroethanol and 25 ml. of water was added dropwise a solution of 0.82 gram of sodium acetate in 10 ml. of water. A brown oil separated from the solution. The reaction mixture was extracted with 25 ml. of methylene chloride. The combined extracts were washed with water, dried, and concentrated to give 2.25 grams (85.9 percent) of 1,1,1-trifluoro-5,5,5-trinitro-2-azapentane, $n_D^{27}$ 1.4260.

When the foregoing example is repeated using 3,3,3-trinitropropanol in lieu of 2,2,2-trinitroethanol, 1,1,1-trifluoro-6,6,6-trinitro-3-azahexane is obtained.

EXAMPLE IV

*Preparation of 1,1,1-trifluoro-3,5,5,5-tetranitro-3-azapentane*

1,1,1-trifluoro-5,5,5-trinitro-3-azapentane, 2.25 grams (0.0086 mole), was dissolved in 20 ml. of acetic anhydride and added to 20 ml. of 99 percent nitric acid at 0 to 5° C. After stirring for 10 minutes, the solution became cloudy and was poured onto ice. The white solid was collected, washed with water, and dried, 1.7 grams (64.5 percent), M.P. 50 to 55° C. Recrystallization from concentrated nitric acid gave white needles, M.P. 58 to 59° C.

*Analysis.*—Calc'd for $C_4H_4F_3N_5O_8$: C, 15.64; H, 1.31; N, 22.81. Found: C, 15.59; H, 1.32; N, 21.79.

EXAMPLE V

*Preparation of 1,1,1-trifluoro-5,5-dinitro-3-azahexane*

To a solution of 1.36 grams (0.01 mole) of 2,2,2-trifluoroethyl amine hydrochloride, 1.5 grams (0.01 mole) of 2,2-dinitropropanol, and 25 ml. of water was added dropwise a solution of 0.4 gram (0.01 mole) of sodium hydroxide in 10 ml. of water. A brown oil separated from the solution. The reaction mixture was extracted with 2 x 25 ml. of methylene chloride. The combined extracts were washed with water, dried, and concentrated to give 2.2 grams of 1,1,1-trifluoro-5,5-dinitro-3-azahexane, $n_D^{25}$ 1.4188.

Upon repeating Example V, using 4,4,4-trifluorobutyl amine instead of 2,2,2-trifluoroethyl amine hydrochloride, 1,1,1-trifluoro-7,7-dinitro-5-azaoctane is obtained in good yield.

EXAMPLE VI

*Preparation of 1,1,1-trifluoro-3,5,5-trinitro-3-azahexane*

1,1,1-trifluoro-5,5-dinitro-3-azahexane, 2.2 grams (0.0095 mole) was dissolved in 20 ml. of acetic anhydride and added to 20 ml. of 99 percent nitric acid at 0 to 5° C. After stirring for 10 minutes, the mixture was poured onto ice. The white solid was collected, washed with water, and dried, 2.05 grams (77.9 percent), M.P. 81 to 82° C. Recrystallization from concentrated nitric acid raised the melting point to 85 to 87° C.

*Analysis.*—Calc'd for $C_5H_7F_3N_4O_6$: C, 21.75; H, 2.56; N, 20.29. Found: C, 22.16; H, 2.73; N, 20.07.

Some of the properties of the compounds for Examples IV and VI are listed in the following table. For comparative purposes, the hydrogen analog of the compound of Example IV (3,5,5,5-tetranitro-3-azapentane) is also listed. In comparing the calculated lead block and ballistic mortar values of 1,1,1-trifluoro-3,5,5,5-tetranitro-3-azapentane and 3,5,5,5-tetranitro-3-azapentane, it is seen that 1,1,1-trifluoro-3,5,5,5-trinitro-3-azapentane has a slightly higher lead block value and a correspondingly lower ballistic mortar value. Inasmuch as high explosives containing the general structure:

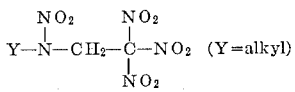

tend to be very sensitive to impact and to possess poor thermal stability, it is especially noteworthy that the impact sensitivity of 1,1,1-trifluoro-3,5,5,5-tetranitro-3-azapentane is greater than 100 cm./2 kg.

followed by reaction with nitric acid in accordance with the following general reaction equations:

(VII)
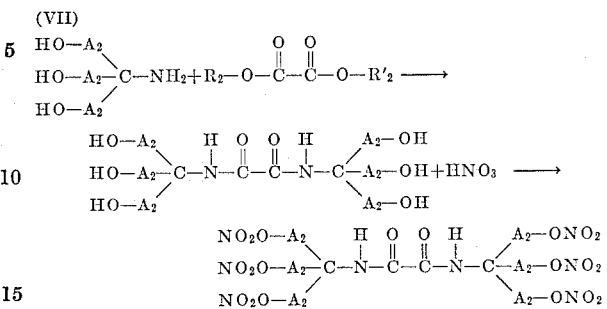

wherein $A_2$ is as defined above, and $R_2$ and $R'_2$ are lower alkyl of from 1 to about 4 carbons. As is made apparent by these equations, the following illustrative reactants and products can be involved.

TABLE II

| Tris (ω-Hydroxyalkyl) Aminomethane | Diester of Oxalic Acid | Nitrating Agent | Product |
|---|---|---|---|
| Tris (ω-hydroxyethyl) aminomethane. | Diethyl oxalate | $HNO_3$ | Bis-N,N-[tris (ω-hydroxyethyl) methyl] oxamide hexanitrate. |
| Tris (ω-hydroxypropyl) aminomethane. | Dipropyl oxalate | $HNO_3$ | Bis-N,N-[tris (ω-hydroxypropyl) methyl] oxamide hexanitrate. |
| Tris (ω-hydroxypentyl) aminomethane. | Dibutyl oxalate | $HNO_3$ | Bis-N,N-[tris (ω-hydroxypentyl) methyl] oxamide hexanitrate. |

TABLE I

| Compound | Impact Sensitivity | Calculated Lead Block Value (TNT=100) | Calculated Ballistic Mortar Value (TNT=100) |
|---|---|---|---|
| $CH_3$-$CH_2$-N($NO_2$)-$CH_2$-C($NO_2$)($NO_2$)-$NO_2$ (3,5,5,5-tetranitro-3-azapentane) | <50 | 158 | 154 |
| $CF_3$-$CH_2$-N($NO_2$)-$CH_2$-C($NO_2$)($NO_2$)-$NO_2$ (1,1,1-trifluoro-3,5,5,5-tetranitro-3-azapentane) | >100 | 164 | 146 |
| $CF_3$-$CH_2$-N($NO_2$)-$CH_2$-C($NO_2$)($NO_2$)-$CH_3$ (1,1,1-trifluoro-3,5,5-trinitro-3-azahexane) | >100 | 113 | 127 |

The impact sensitivity numbers appearing in the table refer to the drop height in centimeters of a 2 kilogram weight at which 50 percent of the trials resulted in an explosion.

Still another new group of compounds prepared according to my invention are the polynitrato compounds having the general formula:

(VI) 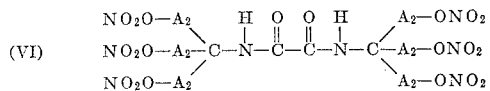

wherein the $A_2$ groups are lower alkylene, preferably having from 1 to about 6 carbon atoms.

These compounds are prepared by reacting a tris(ω-hydroxyalkyl) aminomethane with a diester of oxalic acid, In Equation VII, the tris (ω-hydroxyalkyl) aminomethane and the diester of oxalic acid are generally, although not necessarily, used in about equivalent amounts (two moles of the former per one mole of the latter). The reaction between these two materials is usually accomplished in a substantially inert solvent such as water or the alkanols at a temperature of from about 20° C. to about 250° C.

The nitration of the N,N'-[tris (ω-hydroxyalkyl) methyl] oxamide can be carried out over a wide range of temperatures. It is preferred that the nitration take place at temperatures of from about −20° C. to about +30° C., using up to a slight stoichiometric excess of concentrated nitric acid.

All of the reactions of Equation VII are, in the usual case, carried out at a pressure of about one atmosphere. However, pressures both above and below this are envisioned. The products of these reactions are normally solid at room temperature and may be collected in conventional manner by filtration or evaporation, and purified by washings and recrystallization. Prior to use in explosives, it is best that these materials be thoroughly dried, such as by placing them in an enclosure containing a drying agent such as potassium hydroxide.

The new compounds of Formula VI are, as can be seen, prepared from inexpensive commercially available materials. These compounds are useful as high explosives and as hypotensive agents similar to the use of nitroglycerin.

The following example illustrates the preparation of the compounds of Formula VI.

EXAMPLE VII

*Bis-N,N'-[tris (hydroxymethyl) methyl] oxamide hexanitrate*

A mixture of 12.1 grams (0.01 mole) of tris (hydroxymethyl) aminomethane, 7.3 grams (0.05 mole) of diethyl oxalate, and 200 ml. of absolute ethanol was refluxed for 6.5 hours. The white solid was collected and dried, 14.3 grams (96.7 percent), M.P. 224 to 225° C. In a 500-ml.

3-necked flask, fitted with a stirrer and thermometer, was placed 300 ml. of technical 99 percent nitric acid. The acid was cooled to 0° C. and 29.6 grams (0.1 mole) of bis-N,N'-[tris (hydroxymethyl) methyl] oxamide was added. The reaction mixture was stirred for one hour at 0° C. and poured onto ice. The white solid was collected, washed with water, and dried in vacuo over potassium hydroxide, 54.6 grams (97.3 percent), M.P. 160 to 161° C. Recrystallization from ethylene dichloride did not raise the melting point.

*Analysis.*—Calc'd for $C_{10}H_{14}N_8O_{20}$: C, 21.21; H, 2.49; N, 19.79. Found: C, 21.49; H, 2.75; N, 19.01.

Calc'd Lead Block Value=146 (TNT=100).
Calc'd Ballistic Mortar Value=133 (TNT=100).

EXAMPLE VIII

*Bis-N,N'-[tris (ω-hydroxpropyl) methyl] oxamide hexanitrate*

A mixture of 0.01 mole of tris (ω-hydroxypropyl) aminomethane, 0.05 mole of dibutyl oxalate, and 200 ml. of absolute ethanol is refluxed for about 6 to 7 hours. The white solid is collected and dried. In a 500-ml. 3-necked flask, fitted with a stirrer and thermometer, is placed about 300 ml. of technical 99 percent nitric acid. The acid is cooled to 0° C., and 0.1 mole of bis-N,N'-[tris (ω-hydroxypropyl) methyl] oxamide is added. The reaction mixture is stirred for about one hour at 0° C. and poured onto ice. The white solid is collected, washed with water, and dried in vacuo over potassium hydroxide. Recrystallization from ethylene dichloride did not raise the melting point of the bis-N,N'-[tris (ω-hydroxypropyl) methyl] oxamide nitrate.

The new compounds of my invention, which contain a plurality of nitro or nitrato groups, are inherently useful as high explosives. These compounds can also be used in any conventional explosive missile, projectile, rocket, or the like, as the main explosive charge. An example of such a missile is disclosed in United States Patent 2,470,162, issued May 17, 1949. One way of using these high explosive compounds in a device, such as disclosed in United States Patent 2,470,162, is to pack the explosive in powder form into the warhead of the missile. Alternatively, the compound may be first pelletized and then packed. The liquid compounds can be first absorbed on cotton or sawdust, and then compacted. A charge thus prepared is sufficiently insensitive to withstand the shock entailed in the ejection of a shell from a gun barrel or a rocket launching tube under the pressure developed from ignition of a propellant charge and can be caused to explode on the operation of an impact or time-fuse mechanism firing a detonating explosive such as lead azide or mercury fulminate.

It will be understood that various modifications may be made in this invention without departing from the spirit thereof or the scope of the appended claims.

I claim:

1. Compounds of the formula:

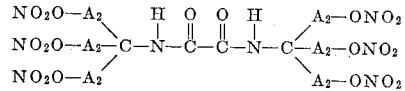

wherein the lower $A_2$ groups are lower alkylene.

2. The compound bis - N,N'-[tris (hydroxymethyl) methyl] oxamide hexanitrate.

3. The method of preparing polynitrato compounds of the formula:

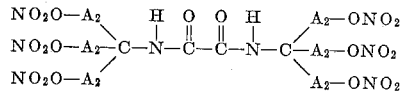

which comprises reacting a tris-(ω-hydroxyalkyl) aminomethane of the formula:

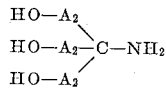

with a diester of oxalic acid of the formula:

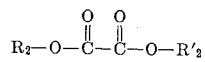

to form a bis-N,N'-[tris (ω-hydroxyalkyl) methyl] oxamide of the formula:

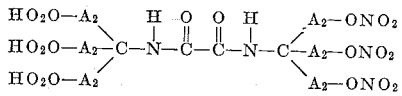

and then reacting this product with nitric acid, and recovering the polynitrato compound; wherein in the foregoing formulae, $A_2$ are lower alkylene radicals, and $R_2$ and $R'_2$ are lower alkyl.

4. The method of preparing bis-N,N'-[tris (hydroxymethyl) methyl] oxamide hexanitrate which comprises reacting tris (hydroxymethyl) aminomethane with diethyl oxalate, reacting the bis-N,N'-[tris (hydroxymethyl) methyl] oxamide thus obtained with nitric acid, and recovering the product produced.

References Cited by the Examiner
UNITED STATES PATENTS
3,238,245  3/1966  Reedy _____ 260—467

BENJAMIN R. PADGETT, *Acting Primary Examiner.*

L. A. SEBASTIAN, *Assistant Examiner.*